May 22, 1928.
C. W. BECK
1,670,296
METHOD OF MAKING ACORN NUTS
Filed Dec. 26, 1923
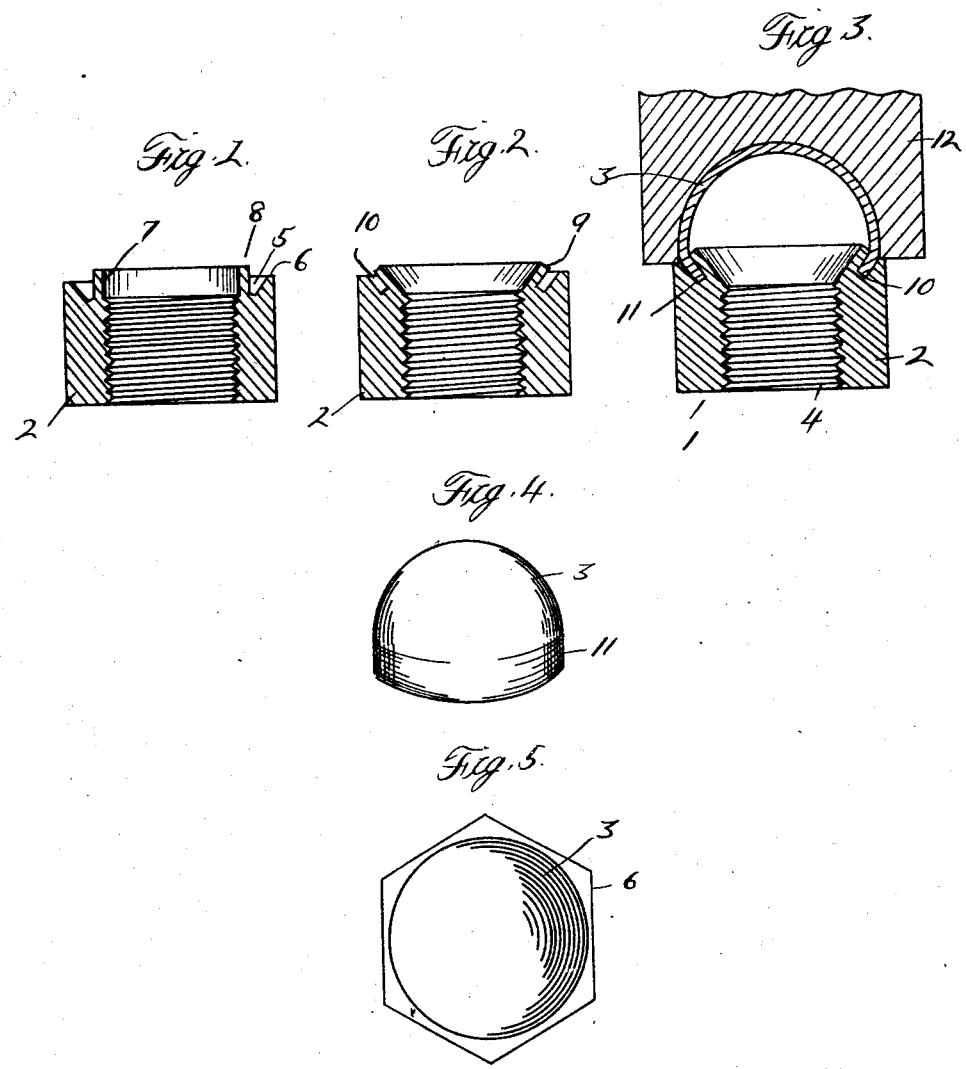
Inventor
Charles W. Beck
Attorneys Patented May 22, 1928.

1,670,296

UNITED STATES PATENT OFFICE.

CHARLES W. BECK, OF TOLEDO, OHIO, ASSIGNOR TO BECK-FROST CORPORATION, OF DETROIT, MICHIGAN, A CORPORATION OF MICHIGAN.

METHOD OF MAKING ACORN NUTS.

Application filed December 26, 1923. Serial No. 682,785.

This invention relates to the art of metal working and refers more particularly to the manufacture of acorn nuts and the like.

An object of the invention is to provide simple and effective means for permanently connecting two different metals together to form the nut.

Another object is to provide a strong and durable construction that is comparatively inexpensive to manufacture.

With the above and other objects in view the invention consists in certain novel features of construction, combinations and arrangements of parts as will be more fully described and particularly pointed out in the appended claims.

In the accompanying drawing:

Figures 1 and 2 inclusive are vertical sectional views through the nut proper;

Figure 3 is a vertical sectional view through the completed acorn nut;

Figure 4 is a vertical sectional view through the cap;

Figure 5 is a top plan view of the nut.

Heretofore acorn nuts have been cast and machined so that the head or cap is integral with the nut proper, however, it has been found that the cast heads of such constructions are not very durable. Moreover, the machined constructions are quite expensive to manufacture. To avoid these objectionable features certain other constructions of nuts have been made in which the nut proper was provided with an annular recess for receiving an enlarged edge portion of a cap, the latter being secured to the nut proper by bending over an outer marginal lip portion of the nut against the enlargement of the cap. However, such constructions are quite expensive to manufacture for the reason that it is necessary to form the cap from relatively heavy stock to provide the enlargement which forms the anchorage means. Furthermore, with such constructions the bent over lip of the nut is apt to be bent back with the result that the cap will work loose or become separated entirely from the nut proper.

With the present invention all of the objectionable features just referred to are overcome entirely and I preferably provide a head or cap that is formed of relatively thin metal and that is secured to the nut proper in such a way that it cannot become separated therefrom.

Referring now to the drawing in which like characters of reference designate corresponding parts throughout the several views, the numeral 1 designates an acorn nut embodying my invention consisting of a nut proper 2 and a hollow cap or head 3. The nut proper may be constructed of any suitable material and may be any shape desired. As shown, the nut proper is preferably hexagonal in form and is provided with a threaded bore 4 that extends through the center thereof, while the cap 3 is preferably dome shaped and is formed from light gauge sheet metal.

In the process of construction an annular recess 5 is first formed in one face 6 of the nut proper. The nut proper is then counter bored as shown at 7 and the flange 8 is subsequently bent over, preferably by a spinning operation so that it is parallel to the inwardly sloping outer wall 9 of the recess 5, thus providing a relatively narrow recess 10 that decreases in diameter from the face 6 of the nut proper to a point adjacent to the bore 4. These operations are preferably done on automatic screw machines. The nut proper is then ready to receive the dome-shaped cap 3. This cap is initially provided with a cylindrical portion 11 that is equal in circumference to the outer circumference of the recess 10 in the nut proper.

To connect the cap to the nut proper, a die member 12 is preferably used to press the cylindrical portion 11 of the cap into the recess 10. During this operation the nut proper forms the complementary die member so that when the die member 12 is moved toward the nut proper the cylindrical portion of the cap will be forced inwardly along the sloping wall 9 of the recess 10 and will be reduced in diameter accordingly. Thus the spun over flange 8 will cooperate with the contracted cylindrical portion of the cap to prevent the latter from becoming disconnected from the nut proper.

From the foregoing description, it will be readily apparent that the connection between the nut proper 2 and the cap 3 is effected by bending the flange 8 outwardly to form the groove 10 which receives the portion 11 of the cap 3. This is the essence of applicant's invention.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. The method of making acorn nuts including the steps of forming an annular groove in an end of a nut proper, spinning the inner wall of the groove laterally over the outer wall, and finally forcing the cylindrical portion of a dome-shaped cap between the walls of said groove.

2. The method of making acorn nuts including the steps of forming an open substantially V-shaped annular groove in an end of a nut proper, spinning the inner wall of said groove laterally in spaced relation to the outer wall of the groove to provide a narrow recess, and finally pressing the cylindrical portion of a dome-shaped cap into said recess.

3. The method of making acorn nuts including the steps of forming in one end of the nut an annular groove having a wall concentric with the axis of the nut and a wall inclined to the axis of the nut spinning the inner concentric wall laterally over the inclined wall to form a recess having substantially parallel walls inclined to the axis of the nut, and finally forcing the cylindrical portion of a dome-shaped cap into the recess provided between said parallel walls.

In testimony whereof I affix my signature.

CHARLES W. BECK.